(12) United States Patent
Berghoff

(10) Patent No.: US 7,322,206 B2
(45) Date of Patent: Jan. 29, 2008

(54) DEVICE FOR REFRIGERATING AND/OR FREEZING PRODUCTS

(75) Inventor: Rudolf Erwin Berghoff, Wedel (DE)

(73) Assignee: Linde Aktiengesellschaft, Wiesbaden (DE)

( * ) Notice: Subject to any disclaimer, the term of this patent is extended or adjusted under 35 U.S.C. 154(b) by 199 days.

(21) Appl. No.: 11/110,783

(22) Filed: Apr. 21, 2005

(65) Prior Publication Data

US 2005/0262867 A1    Dec. 1, 2005

(30) Foreign Application Priority Data

Apr. 22, 2004  (DE) .................... 10 2004 020 193

(51) Int. Cl.
*F25D 25/00* (2006.01)
*F25D 25/04* (2006.01)

(52) U.S. Cl. ..................... 62/378; 62/380; 198/952

(58) Field of Classification Search ............... 62/201, 62/345, 378, 380; 198/493, 952, 860.1
See application file for complete search history.

(56) References Cited

U.S. PATENT DOCUMENTS

| | | | | |
|---|---|---|---|---|
| 2,080,103 A | * | 5/1937 | Zarstschenzeff | 62/63 |
| 2,610,476 A | | 9/1952 | Field | |
| 3,442,801 A | * | 5/1969 | Anderson | 62/534 |
| 3,664,149 A | | 5/1972 | Garland et al. | |
| 3,992,994 A | * | 11/1976 | Mitter | 101/425 |
| 4,576,562 A | * | 3/1986 | Anderson | 425/126.2 |
| 4,679,542 A | * | 7/1987 | Smith et al. | 126/21 A |
| 5,322,432 A | * | 6/1994 | Gilje | 425/91 |
| 5,444,985 A | * | 8/1995 | Lang et al. | 62/63 |
| 5,467,612 A | * | 11/1995 | Venetucci | 62/374 |
| 5,765,381 A | * | 6/1998 | Renz | 62/63 |
| 6,334,330 B2 | * | 1/2002 | Lang et al. | 62/374 |
| 6,536,220 B2 | * | 3/2003 | Visaisouk | 62/71 |
| 6,623,778 B2 | * | 9/2003 | Kershman et al. | 426/552 |
| 6,629,493 B1 | * | 10/2003 | Schaible et al. | 99/352 |

FOREIGN PATENT DOCUMENTS

| | | | |
|---|---|---|---|
| JP | 5-306869 A | * | 11/1993 |
| WO | WO 98/41460 | * | 9/1998 |
| WO | WO 99/02931 | | 1/1999 |
| WO | WO 2005/003657 A1 | | 1/2005 |

OTHER PUBLICATIONS

European Search Report Dated Jun. 29, 2005 (Three (3) Pages).

* cited by examiner

*Primary Examiner*—Mohammad M. Ali
(74) *Attorney, Agent, or Firm*—Crowell & Moring LLP

(57) ABSTRACT

A device for refrigerating and/or freezing products in which the products are conveyed by a conveyor belt through a treatment zone equipped with refrigeration equipment. The conveyor belt passes over sliding rails which are mounted on a supporting frame. To prevent excessive sticking of products on the conveyor belt, the sliding rails are arranged with a convex and/or concave curvature in at least in some sections, so that the conveyor belt slides on predetermined curvatures. Shearing forces are therefore created at the contact faces of the conveyor belt and product, resulting in release of the product.

4 Claims, 2 Drawing Sheets

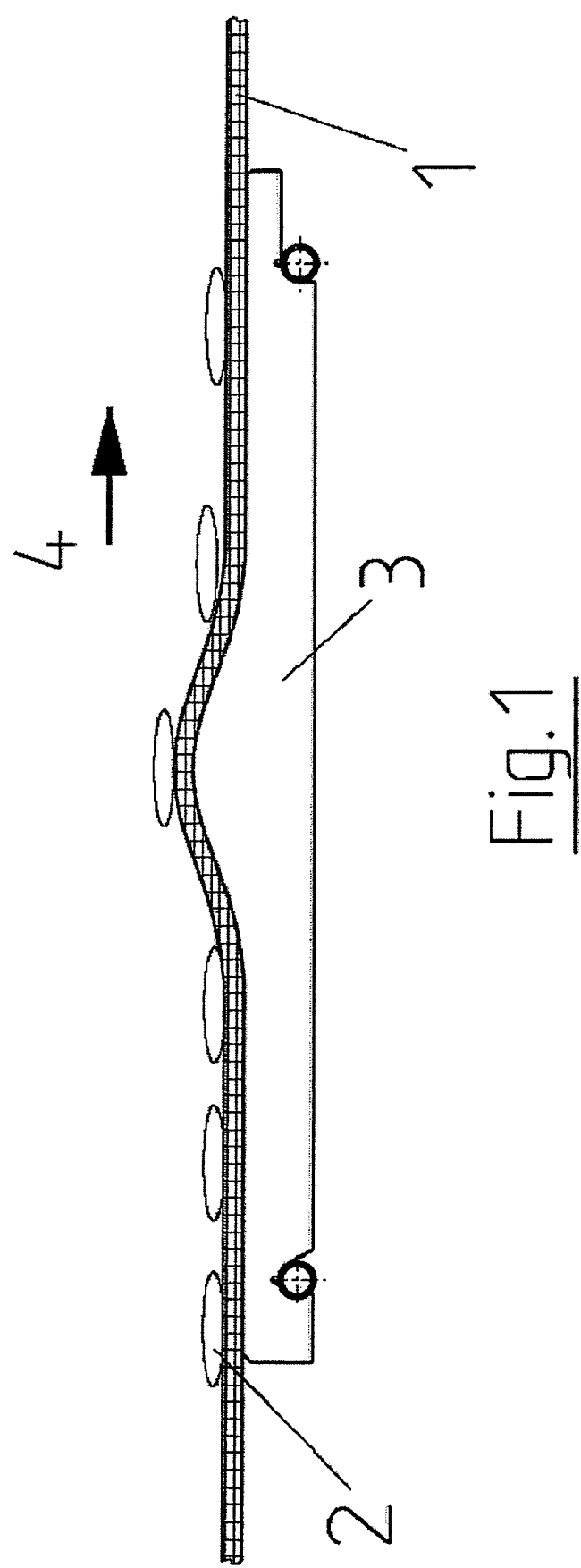

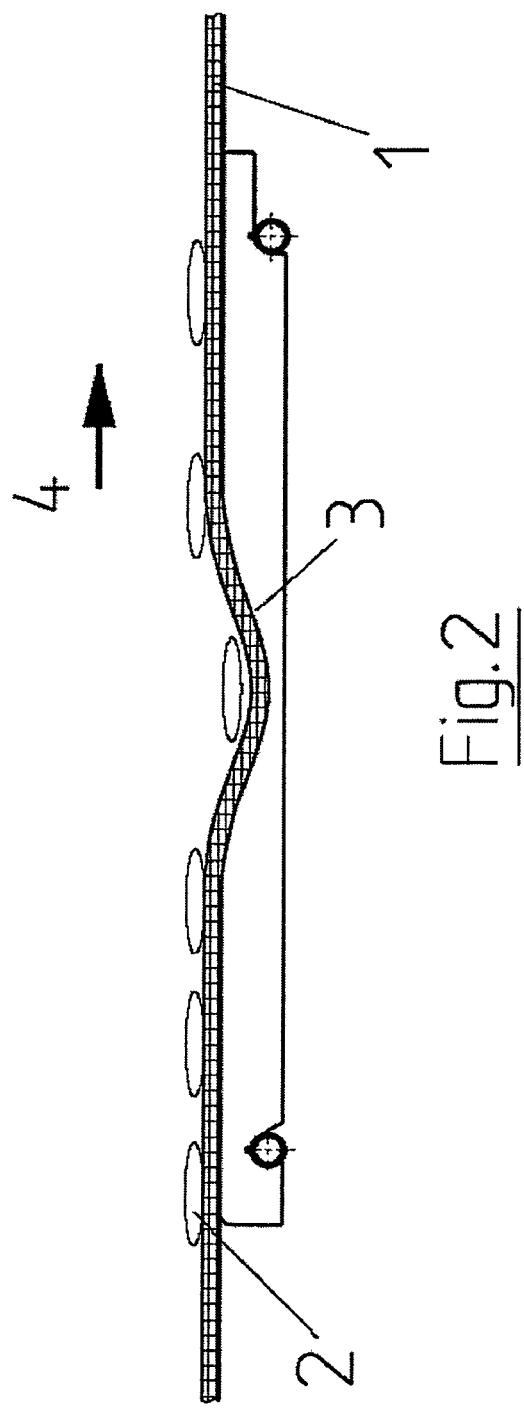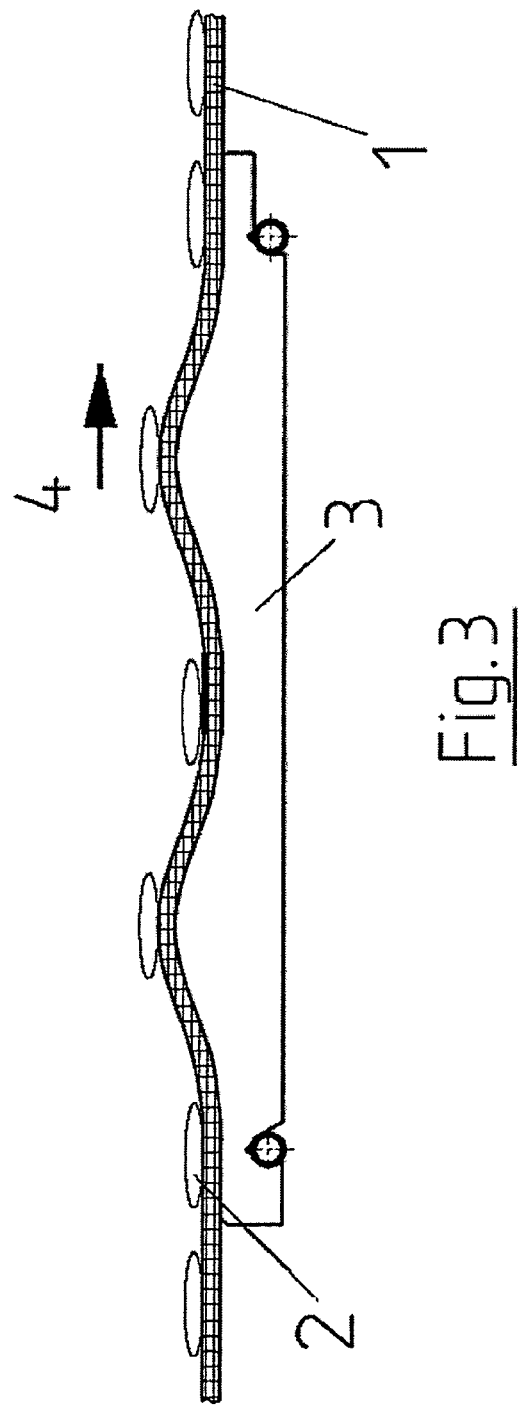

DEVICE FOR REFRIGERATING AND/OR FREEZING PRODUCTS

This application claims the priority of German Application No. 102004020193.5, filed Apr. 22, 2004, the disclosure of which is expressly incorporated by reference herein.

BACKGROUND AND SUMMARY OF THE INVENTION

This invention relates to a device for refrigerating and/or freezing products with a treatment zone equipped with refrigeration equipment and a conveyor belt situated in the treatment zone for conveying the products through the treatment zone, the conveyor belt being supported by a supporting frame and guided over sliding rails mounted on the supporting frame.

Equipment in which the products are conveyed through a treatment zone in which refrigeration equipment is provided is often used for refrigerating and/or freezing products, in particular foods. For example so-called tunnel freezers in which foods are conveyed through a tunnel-like housing while a refrigerant, in particular a liquid gas such as liquid nitrogen, is sprayed onto the foods are in widespread use. For conveying foods through the tunnel freezer, a conveyor belt on which the foods are moved continuously through the tunnel freezer and are refrigerated and/or frozen in the process is generally used. Such conveyor belts typically have a width of 200 mm to 2000 mm, for example. The conveyor belts are supported mechanically from beneath as they are guided through the tunnel freezer due to the inherent weight and that of the product on the conveyor belt. A supporting frame of pipes, beams and plates is used for support. To minimize friction between the conveyor belt and the supporting frame, sliding rails, e.g., made of plastic, are mounted on the supporting frame, the conveyor belt being guided over these rails. The upper surface of the sliding rails is usually flat so that the conveyor belt is guided over them flatly. During freezing, product frequently adheres to the conveyor belt and it is difficult to release the frozen product from the conveyor belt at the end of freezing or this may be accomplished only with damage.

The object of the present invention is therefore to design a refrigeration and conveying device that prevents sticking of the products to the conveyor belt in freezing or at least allows frozen product that has stuck to the conveyor belt to be released without damage.

This object is achieved according to this invention by designing the sliding rails so they have a convex and/or concave shape on the top side in at least some sections, so that the conveyor belt slides on predefined curvatures.

This invention is based on the finding that it is very difficult to detach products from the conveyor belt at the end of the tunnel after freezing is complete. When product is released at the end of the tunnel, it not only results in destruction of the product but also damage to the conveyor belt. It is therefore proposed that the products be released from the conveyor belt already at a point in time when the connection between the product and the conveyor belt is not yet too strong. The product is therefore released from the conveyor belt not only at the end of the freezer but already within the freezer before the product has completely frozen and stuck. Therefore, the shape of the sliding rails is not flat on the top side but instead is convex and/or concave in at least some sections. The conveyor belt therefore does not slide flatly through the freezer but instead moves on specifically predetermined curvatures, i.e., radii, in at least some sections, so that a relative movement between the conveyor belt and the product creates shearing forces in the contact surfaces of the conveyor belt and product leading to detachment of the product.

The detachment of the products from the conveyor belt may also be accomplished repeatedly within the treatment zone. To this end, multiple convex and/or concave sections of the sliding rails are provided within the treatment zone. The shape of the elevation in the sliding rails may be designed differently. The sliding rails may also have a depression instead of an elevation, so the products become detached from the conveyor belt in a valley. A combination of elevation and depression of the sliding rails is also conceivable.

According to a particularly preferred embodiment of this invention, concave and convex sections of the sliding rails alternate along the direction of conveyance. This largely prevents products from adhering to the conveyor belt as they freeze.

This invention may be used with all conceivable devices for refrigerating and/or freezing products in which the products are conveyed through a treatment zone equipped with refrigeration equipment by means of a conveyor belt. This invention manifests its advantages most especially when used in tunnel freezers for freezing foods. In such tunnel freezers, spray nozzles for spraying liquid gas onto the foods are provided in the treatment zone.

A number of advantages are associated with this invention:

The products do not adhere so greatly to the conveyor belt in freezing because they are released in advance. Furthermore the products show little or no damage after the freezing operation. Product loss (rejects) is much lower. Since the products are released from the conveyor belt even before leaving the treatment zone, strippers mounted at the end of the freezer suffer less damage and therefore have much longer lifetimes.

Other objects, advantages and novel features of the present invention will become apparent from the following detailed description of the invention when considered in conjunction with the accompanying drawings.

BRIEF DESCRIPTION OF THE DRAWING

FIG. 1 shows a sliding rail with the conveyor belt above it, the rail being convex in sections in accordance with an embodiment of the present invention.

FIG. 2 shows a sliding rail with the conveyor belt above it, the rail being concave in sections in accordance with an embodiment of the present invention.

FIG. 3 shows a sliding rail having convex and concave sections with the conveyor belt situated above it in accordance with an embodiment of the present invention.

DETAILED DESCRIPTION

FIG. 1 shows a sliding rail 3 having a convex elevation. The conveyor belt 1 guided over the convex sliding rail 3 follows the course of the convex sliding rail 3 so that the products 2 situated on the conveyor belt 1 are released from the conveyor belt 1 on the convex elevation of the sliding rail 3 during conveyance in the direction of travel 4 of the belt.

FIG. 2 shows a sliding rail 3 having a concave depression. In conveyance of the products 2 over this concave depression in the direction of travel 4 of the belt, the products are also released from the conveyor belt 1.

Finally, FIG. 3 also shows a sliding rail 3 which has both convex elevations and a concave depression. This is especially effective in preventing the products 2 from adhering too securely to the conveyor belt 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for refrigerating and/or freezing products having a treatment zone equipped with a refrigeration device and a conveyor belt situated in the treatment zone for conveying the products through the treatment zone, whereby the conveyor belt is supported by a supporting frame and is guided over sliding rails mounted on the supporting frame, wherein within the treatment zone the sliding rails have a convex and/or concave shape in at least some sections on their top side so that the conveyor belt slides on predetermined curvatures so as to cause relative motion between the conveyor belt and the products to detach the products from the conveyor belt.

2. Device as claimed in claim 1, wherein the treatment zone is a tunnel freezer for freezing foods, with spray nozzles being provided in the treatment zone for spraying liquid gas onto the foods.

3. Device for refrigerating and/or freezing products having a treatment zone equipped with a refrigeration device and a conveyor belt situated in the treatment zone for conveying the products through the treatment zone, whereby the conveyor belt is supported by a supporting frame and is guided over sliding rails mounted on the supporting frame, wherein the sliding rails have a convex and/or concave shape in at least some sections on their top side so that the conveyor belt slides on predetermined curvatures, and multiple convex and/or concave sections of the sliding rails are provided within the treatment zone.

4. Device as claimed in claim 3, wherein convex and concave sections alternate along the direction of conveyance.

* * * * *